United States Patent Office 3,489,581
Patented Jan. 13, 1970

3,489,581
REFRACTORY AND METHOD OF MAKING
Maurice Rowland, 7 Freeman Road, Toronto,
Ontario, Canada
No Drawing. Continuation-in-part of application Ser. No. 474,997, July 26, 1965. This application Aug. 19, 1966, Ser. No. 573,466
Int. Cl. C04b 35/14, 7/28
U.S. Cl. 106—64                 2 Claims

ABSTRACT OF THE DISCLOSURE

A very high temperature refractory body is constructed of 40–75% by volume of rice hull ash, 10–20% by volume of aluminous cement and 5–50% of reclaimed firebrick. Iron oxide in the aluminous cement and in the reclaimed fire brick must be limited as specified in the application to avoid injurious effects on the performance of the refractory.

---

This application is a continuation-in-part of my application Ser. No. 474,997, filed July 26, 1965 (now abandoned).

This invention relates to a method of making refractory materials having rice hull ash as a substantial constituent and to the refractory materials so produced.

Rice hulls are thin concavo-convex plant tissues having surface irregularities related to the internal cell structure of the hull. Rice hulls contain about 20% silica and when the hulls are burned so that the carbonaceous matter is substantially removed, the ash resulting therefrom contains about 96% silica. Because the silica is distributed with substantial uniformity throughout the rice hull, the ash fragments possess the same general shape as the original hull and in fact form a siliceous skeleton which reveals substantially all the morphological features of the original hull, including the concavo-convex shape and the surface irregularities and in addition exhibit a certain degree of porosity deriving in large part from the calcination and consequent removal of organic matter.

When a mass of rice hull ash fragments with random orientations is molded together in combination with a suitable bonding agent a useful porous body is formed.

According to the invention, rice hull ash is employed in a refractory composition. Typical analysis of the true ash is as follows:

| | Percent |
|---|---|
| $SiO_2$ | 96.5 |
| SaO | 0.25 |
| MgO | 0.25 |
| $K_2O$ | 1.00 |
| $Na_2O$ | 0.4 |
| $P_2O_5$ | 0.3 |
| $SO_2$ | 1.00 |
| Cl | Trace |
| $Fe_2O_3$ | Trace |
| $MnO_2$ | Trace |

The invention provides that by mixing aluminous cement, rice hull ash and a filler, without the addition of water, a mixture is produced, which, on the addition of water, may be:

(a) Used to produce a plaster or surfacing material for application to other surfaces;
(b) Poured into moulds, or other shaping structures to produce refractory bodies such as brick, blocks, or the like;

In either case resulting in the production of a refractory in rigid form without the necessity of using any compacting pressure and without the necessity of firing the product to achieve a bond;

Care must be taken that the iron oxide content of the aluminous cement does not exceed, about 3% by weight since, over this amount, the iron oxide will, at refractory temperatures, react to a material degree with the silica in the rice hull ash and/or will act as a flux to facilitate crystaline changes in such silica, and on other bases to cause destruction of the body in which these materials are contained.

In the above manner, refractory surfaces or bodies are produced without the necessity of firing since, with the addition of water, the cementitious bond is cold formed, and without the necessity of using a compacting pressure.

By the term "refractory" herein it is intended to include both the plasters and surfacing material (when formed in place) and refractory bodies such as bricks, blocks or the like.

In this manner there is formed a refractory which is exceedingly (a) light, and (b) strong, and which is superior to prior refractories in: (c) maintaining its form under the application of high heats, (d) in insulating qualities and (e) the hitherto unforseen heat reflecting qualities of its surface and of the internal pores.

In relation to its (a) lightness and (b) strength, preferred components of the filler are reclaimed fire brick (fire brick which having been subjected to high heats in a furnace or other high temperature application, is pulverized for re-use) and pearlite. The pearlite because of its form lends lightness to the mix and prevents, by its presence, migration or lumping of the components of the mixture prior to setting. On the other hand, unless a different type of filler is also used with the pearlite, the refractory produced (bearing in mind that the substantial component is rice hull ash) will be unduly weak. Accordingly, for most uses of the refractory, at least equal proportions of reclaimed firebrick to pearlite should be used to avoid undue fragility. To the extent that strength is desired in the refractory, at the expense of increased density, the proportion of fire brick in relation to pearlite may be increased until the entire filler is substantially composed of fire brick. Although a refractory, wherein the filler is entirely reclaimed fire brick, will be denser than one having a proportion of pearlite, it must be remembered that even such refractory wherein the filler is denser than pearlite will be lighter than prior refractories because of:

(i) the presence of large quantities of rice hull ash and the porosity in the refractory produced thereby;
(ii) the fact that the refractory has not been compacted by pressure during its formation;

and will be more heat resistant and of more insulating value because of the high reflectivity of rice hull ash, and the other qualities of the ash discussed herein.

Refractories made in accord with the invention are when in their solid state, due to the curing of the cement bond, more highly heat resistant than the prior refractory products. This is particularly true when the filler is composed of reclaimed fire brick with or without pearlite. When pearlite with reclaimed fire brick in about equal proportions by volume, is used; refractories have been made which will adequately retain their form at sustained temperatures of 2500° F. but not as high as 2800° F.; when reclaimed firebrick only is used, the refractories may be made which will retain their form at sustained temperatures of over 2800° F.

In addition to the qualities of the refractory due to the constituents of the filler; the increased tolerance to heat, of refractories formed in accord with the invention is believed to be due to: (reference is made to the correspondingly lettered phrases in column 2, lines 19–24).

(a) the ability of rice hull ash to maintain its form at high temperatures;

(b) the high reflectivity of the surface of the refractory due to the presence of the rice hull ash, which prevents an unusually high proportion of impinging heat waves from entering the body;

(c) the similar reflectivity about each pore, formed in the refractory due to the rice hull ash, both the pore and the reflectivity being caused by the rice hull ash;

(d) the high reflectivity of the refractory produced due to the presence of the rice hull ash is referred to above. Such reflectivity protects not only the refractory itself, but reduces the conduction of heat through the refractory to bodies on the cooler side thereof, protecting them also;

(e) the high insulation qualities are caused by the pores created throughout the body by the presence of the rice hull ash. The reflectivity of rice hull ash has not, it is believed, been known heretofore.

It will be noted that while fire brick is composed mainly of clay, this, however, in reclaimed fire brick, is clay in a burnt or fired condition. Where aluminous cement is used as a binder, raw (i.e. unfired) clay is found to be deleterious to the mixture when present in the mixture in any substantial proportions as it tends to interfere with the setting and binding effectiveness of the cement.

In a preferred application of the invention, rice hull ash, filler and aluminous cement are thoroughly mixed in the following proportions (by volume):

| | Parts |
|---|---|
| Rice hull ash | 5 |
| Fire brick of less than ¼″ particle size | 1 |
| Pearlite of about 3⁄16″ particle size | 1 |

The fire brick should be selected to ensure that no unduly high content of iron oxide is contained therein (although in most fire brick, iron oxide content will be well below the level where deleterious effects might be experienced). The reason is that at the temperatures of use, the iron oxide (to an extent varying with its particular form) will react with the rice hull ash or will act as a flux assisting changes in the crystal structure of the rice hull ash, and due to either or both of the above causes will tend to destroy the structure thereof and hence the form and structure of the brick. In general it has been found that the iron oxide in the filler should not be present beyond about 3% by weight and is preferably as low as possible. In fact, with conventional fire brick, the iron oxide content is not a problem, as the usual iron oxide content in fire brick is about 2.8%–3.0%.

The iron oxide content of the pearlite will not be a problem, since there the content will usually be within the range of 0.5% to 1.5% by weight.

The above mixture will be mixed with one part by volume (relative to the seven parts already discussed) of aluminous cement. Such cement must be selected so that the iron oxide content is not more than about 3% by weight *of the cement*, since aluminous cements of considerably higher iron oxide contents have been found to cause a breakdown in the structure of the brick at refractory operating temperatures. A cement useful for this purpose is sold under the trade designation "Rolandshutte" merchandized by Webster and Sons Limited, 5521 Dundas St. W., Toronto, Ontario, Canada.

For best results, the iron oxide content in the mixture should be as low as possible. Exact limits for amounts of iron oxide which will unduly react with the rice hull ash to destroy the refractory structure, cannot be set, since the reactions due to the presence of iron oxide will depend on its form in a particular cement or filler which will vary from one filler or cement to another.

With this mixture, so far in dry form there are alternative methods of use.

(1) The mixture may be sold or shipped in this form for mixture on a site and at the site may be mixed with sufficient water to make mouldable paste and to allow the cement to form a cementitious bond.

Such paste may be spread to the depth required to form a refractory surface on existing walls. The thickness may be varied as desired since the applied surface, as long as 't is not too thick in its location and orientation, will retain its form until set, and will, when set, form a rigid body adequate to withstand sustained temperatures of up to 2500° F. With an existing refractory surface, to which the inventive mixture is to be applied, good results have been obtained where the inventive mixture has been used to provide a surface about ¼″ deep over the existing refractory. Such a paste has been found very useful (in addition to covering whole walls) for patching existing cracks in refractory walls. It has been found with such patches however that the patch must not only cover the crack, but extend over surfaces of the existing wall on each side thereof to prevent access by the heat to the original edge defining the crack.

(2) The mixture may, at the place of manufacture, be mixed with sufficient water to form a mouldable paste and placed in moulds or other shaping structures to form refractory bricks, blocks or the like or other high temperature products. This is believed to be a more wide commercial use of the invention than the "on site" plastering or surfacing referred to in the preceding paragraph.

When bricks, blocks and other bodies are made in this way, no pressure or compaction is required as the body will set rigidly in the mould or shaping structure due to the cementitious bond. Hence a light and porous product is formed, unequalled in these regards, by existing bodies. Similarly in this method, no firing of the moulded body is required, since the cementitious bond forms the body rigidly in its permanent shape. Hence the shrinkage, and expense and time associated with firing fired bricks is avoided by this method. The bodies formed, in accord with the invention, will presumably be subject to high temperatures when in use, but at the time of use, the shrinkage thereof has been found to be much less than with prior products and well within tolerable limits.

Experimentation has been performed with the more commonly known portland cements and these do not provide a comparable or satisfactory refractory.

In relation to the proportions used, it will be noted that the equal proportions of pearlite to reclaimed fire brick may be varied. However, although increased lightness may be obtained by increasing the ratio of pearlite to the reclaimed fire brick, it will be found that as the pearlite is increased beyond equal proportions, by volume to reclaimed fire brick, the body will become too weak or fragile for most practical uses.

Moreover the example given is useful for temperatures up to 2500° F. A body may be constructed to maintain its structure at temperatures exceeding 2800° F. by elimination of the pearlite and the substitution therefor of reclaimed fire brick in approximately the same amounts by volume. Such a body, wherein the filler is substantially all reclaimed fire brick, will be stronger, and more temperature resistant than the same product using substantial quantities of pearlite, although heavier due to the higher density of fire brick.

Other fillers may be substituted wholly or partially for the pearlite or reclaimed fire brick, or for one of them, care being taken that the iron oxide content in such fillers does not exceed about 3% by weight for the reasons set out heretofore. The filler, in the absence of reclaimed fire brick, must also be sufficient to supply the strength to the body, otherwise supplied by the reclaimed fire brick. However it should be noted that for use at temperatures exceeding 2800° F., the filler should be reclaimed fire brick.

As much rice hull ash will be used as possible, consistent with maintaining the strength and handling qualities of the brick which decrease as the proportion of rice hull ash is increased. It is from the rice hull ash that many of the unique advantages of the inventive refractory body will accrue. Thus the high temperature tolerance of the body accrues to a considerable extent from the similar qualities of the rice hull ash itself. The lightness of the refractory body is due to the lightness of the rice hull ash and to the pores formed within and about the unique form of the ash particles. The insulating qualities are also due to the pores already produced. The heat tolerance of the body is increased by the high reflectivity of the ash both on exposed surfaces of the body or surfaces facing the enclosed pores therein.

At rice hull ash quantities of greater than 75% (by volume) of the mixture of ash, filler and cement, it will be found that the product is too weak for most purposes, while at ash quantities of less than 40% by volume, the beneficial effects of the ash will be substantially diminished.

The aluminous cement with low iron content, as previously discussed, will be used in quantities sufficient to bind the mixture with a cementitious bond into a rigid body. The amount will vary with the constituents of the filler and the proportions of the rice hull ash to filler. Good results have been obtained where the cement is added to about ⅛ the volume of the dry mix, and the required amount will usually be between 10%–20% (by volume) of the dry mixture.

Water will be added in each case in proportions sufficient to provide the required plasticity of the mix and ensure that the aluminous cement may form the required bond.

In the above manner there is formed a refractory surface or body which is lighter, stronger and more self-sustaining under high temperatures, and having higher heat reflecting and insulating qualities than prior products.

It will be noted that because of the high insulating qualities, that bodies or surfaces formed in accord with the invention, may be used for insulation, even though high temperatures are not encountered.

The high heat tolerance of bodies and surfaces formed in accord with the invention, may be further increased by providing a coating of rice hull ash on the heat exposed surface of the inventive body or surface. This is dealt with generally in my co-pending application 474,935 (now abandoned) filed simultaneously herewith. In accord with the processes of this invention, the rice hull ash coating to the exposed surface should be applied after the body or surface has been formed but before the cementitious bond has set. Accordingly, at this time, the rice hull ash, in its characteristic dry (i.e. "powdered" or "flake-like") form will adhere to the unset cement on the exposed surface and be retained there by such cement when set. The thickness of the rice hull ash coating is unimportant but the coating should occlude the surface to which it is applied.

I claim:

1. A refractory body consisting essentially of a mixture of 40–75% by volume of rice hull ash, 10–20% by volume of aluminous cement of the type having not more than about 3% by weight of iron oxide and 5–50% by volume of a reclaimed fire brick having not more than about 3% by weight iron oxide bonded into a rigid body by the said cement.

2. A refractory body consisting essentially of a mixture of rice hull ash, aluminous cement and a reclaimed fire brick, in the following proportions:

| | Parts by volume |
|---|---|
| Rice hull ash, about | 5 |
| Reclaimed fire brick, about | 2 |
| Aluminous cement, about | 1 | formed into a rigid body, said aluminous cement and said reclaimed fire brick being selected so that neither has a constituent iron oxide in quantities greater than about 3%.

References Cited
UNITED STATES PATENTS

| 2,720,462 | 10/1955 | Jones | 106—69 |
| 2,963,377 | 12/1960 | Renkey | 106—64 |

JAMES E. POER, Primary Examiner

U.S. Cl. X.R.
106—68, 69, 104